United States Patent
Yamada

(10) Patent No.: US 11,321,922 B2
(45) Date of Patent: May 3, 2022

(54) VIRTUAL IMAGE DISPLAY DEVICE

(71) Applicant: JVCKENWOOD Corporation, Kanagawa (JP)

(72) Inventor: Yasuyuki Yamada, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 74 days.

(21) Appl. No.: 16/824,826

(22) Filed: Mar. 20, 2020

(65) Prior Publication Data
US 2020/0218076 A1    Jul. 9, 2020

Related U.S. Application Data

(63) Continuation of application No. PCT/JP2018/010176, filed on Mar. 15, 2018.

(30) Foreign Application Priority Data

Sep. 27, 2017 (JP) .............................. JP2017-185947
Sep. 27, 2017 (JP) .............................. JP2017-185948

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0179* (2013.01); *G06T 3/40* (2013.01);
(Continued)

(58) Field of Classification Search
CPC ........ G06T 19/006; G09G 5/373; G09G 5/38; G09G 2320/0613; G09G 2354/00
See application file for complete search history.

(56) References Cited

U.S. PATENT DOCUMENTS

2008/0284766 A1* 11/2008 Chang .................... G09G 3/006
345/206
2013/0038712 A1* 2/2013 Valaix .................... B60K 35/00
348/77
(Continued)

FOREIGN PATENT DOCUMENTS

JP    H06-115381 A    4/1994
JP    H11-16091 A    1/1999
(Continued)

OTHER PUBLICATIONS

International Preliminary Report on Patentability dated Mar. 31, 2020, from International Application No. PCT/JP2018/010176, 14 pages.

(Continued)

*Primary Examiner* — Michelle L Sams
(74) *Attorney, Agent, or Firm* — Brundidge & Stanger, P.C.

(57) ABSTRACT

A virtual image display device includes a virtual image position selector, a vision measurement interface, a display information acquirer, a display image generator, and a projection processor. The virtual image position selector selects either a first virtual image position or a second virtual image position as a display position of the virtual image. The vision measurement interface measures a vision of a user based on a user's response to a vision measurement image projected as a virtual image at the display position. The display information acquirer acquires information to be shown. The display image generator generates a display image showing an image corresponding to the information acquired by the display information acquirer in a size determined by the vision acquired by the vision measurement interface. The projection processor performs a projec- (Continued)

tion process of projecting the display image generated by the display image generator as a virtual image.

5 Claims, 15 Drawing Sheets

(51) Int. Cl.
  *G09G 5/373* (2006.01)
  *G09G 5/38* (2006.01)
  *G06T 3/40* (2006.01)
  *B60K 35/00* (2006.01)

(52) U.S. Cl.
  CPC ............... *G09G 5/373* (2013.01); *G09G 5/38* (2013.01); *B60K 35/00* (2013.01); *B60K 2370/1529* (2019.05); *G09G 2320/0613* (2013.01); *G09G 2354/00* (2013.01); *G09G 2380/10* (2013.01)

(56) References Cited

U.S. PATENT DOCUMENTS

| | | | |
|---|---|---|---|
| 2015/0264299 A1* | 9/2015 | Leech | H04N 19/17 348/78 |
| 2015/0271408 A1* | 9/2015 | Cancel Olmo | G06F 1/1694 348/208.6 |

FOREIGN PATENT DOCUMENTS

| | | | |
|---|---|---|---|
| JP | 2005-096645 A | | 4/2005 |
| JP | 2009-210432 A | | 9/2009 |
| JP | 2009210432 A | * | 9/2009 |

OTHER PUBLICATIONS

International Search Report from International Application No. PCT/JP2018/010176 dated Jun. 19, 2018, 3 pages.

* cited by examiner

FIG. 4

| INFORMATION NAME | EXTERNAL DEVICE | CATEGORY | PRIORITY LEVEL |
|---|---|---|---|
| TRAVELING SPEED | ELECTRONIC CONTROL DEVICE (SPEED METER SYSTEM) | VEHICLE INFORMATION | HIGH |
| ENGINE INFORMATION (ENGINE TEMPERATURE ETC.) | ELECTRONIC CONTROL DEVICE (ENGINE CONTROL SYSTEM) | VEHICLE INFORMATION | MEDIUM |
| MAINTAINED SPEED | ELECTRONIC CONTROL DEVICE (AUTOMATIC TRAVELING CONTROL SYSTEM) | VEHICLE INFORMATION | MEDIUM |
| COLLISION ALERT | ELECTRONIC CONTROL DEVICE (COLLISION PREVENTION CONTROL SYSTEM) | VEHICLE INFORMATION | MEDIUM |
| OUTSIDE TEMPERATURE | ELECTRONIC CONTROL DEVICE (OUTSIDE TEMPERATURE SENSOR) | OUTSIDE ENVIRONMENT INFORMATION | LOW |
| BROADCAST SYSTEM TO RECEIVE FROM | AUDIO DEVICE | INTRA-VEHICLE INFORMATION | LOW |
| REGULATION INFORMATION | MAP DISPLAY DEVICE ETC. | REGULATION INFORMATION (RELATED TO TRAVELING) | HIGH |
| | | REGULATION INFORMATION (NOT RELATED TO TRAVELING) | LOW |
| WARNING SIGN | MAP DISPLAY DEVICE ETC. | WARNING INFORMATION | HIGH |
| GUIDANCE SIGN | MAP DISPLAY DEVICE ETC. | GUIDANCE INFORMATION | LOW |
| ROUTE GUIDANCE | MAP DISPLAY DEVICE ETC. | ROUTE GUIDANCE INFORMATION | HIGH |

VIRTUAL IMAGE DISPLAY DEVICE

CROSS-REFERENCE TO RELATED APPLICATION

Priority is claimed to Japanese Patent Application No. 2017-185947, filed on Sep. 27, 2017, and Japanese Application No. 2017-185948, filed on Sep. 27, 2017, the entire content of which is incorporated herein by reference.

BACKGROUND OF THE INVENTION

1. Field of the Invention

The present invention relates to a virtual image display device.

2. Description of the Related Art

A virtual image display device such as a head-up display provided in a vehicle displays a virtual image superimposed on the scenery outside the vehicle by transmitting light entering from outside the vehicle and reflecting a display image projected from an optical unit provided inside the vehicle to, for example, a front glass of the vehicle. The virtual image display device allows a user viewing the scenery outside the vehicle to recognize information in the image projected from the optical unit without substantially changing the line of sight or the point of focus.

As the volume of information in the display image displayed by the virtual image display device increases, individual images included in the display image will be finer, which could possibly result in lower visibility depending on the vision (eyesight) of the user. Patent document 1 discloses a display control device capable of determining the status of visual sense of the driver while the driver is driving a vehicle. The display control device computes the size of a Landolt ring for use in vision measurement corresponding to the legal vision standard for driving, in accordance with the distance from the display device displaying the Landolt ring to the eye point of the user and displays the Landolt ring accordingly. If the user can recognize a direction of a slit in the displayed Landolt ring, it is possible to know that the user meets the legal vision standard.

[Patent document 1] JP 2005-096645

SUMMARY OF THE INVENTION

According to the display control device disclosed in patent document 1, it is possible to know that the user meets the legal vision standard. If, however, the user meets the legal vision standard but has relatively poor vision, there is no means to enhance the visibility of fine images displayed inside and outside the vehicle.

In the case of a virtual image display device, in particular, the user viewing the scenery outside the vehicle can recognize a virtual image without substantially changing the line of sight or the point of focus. Therefore, there is a tendency to include much information in the display image. If the user has poor vision, the visibility of displayed images may be lowered.

The first invention addresses the above-described issue, and a general purpose thereof is to provide a virtual image display device capable of displaying an image in accordance with the vision of the user and enhancing the visibility.

Further, the display control device disclosed in patent document 1 makes it possible to know that the user meets the legal vision standard but does not address cases where the visibility of images displayed inside and outside the vehicle varies due to far-sightedness or near-sightedness.

In the case of a virtual image display device, in particular, the user viewing the scenery outside the vehicle can recognize a virtual image without substantially changing the line of sight or the point of focus. Therefore, there is a tendency to include much information in the display image. There has been a problem in that the visibility is lowered due to far-sightedness or near-sightedness depending on the display position of the virtual image.

The second invention addresses the above-described issue, and a general purpose thereof is to provide a virtual image display device capable of selecting a distance at which the virtual image is displayed and enhancing the visibility.

A virtual image display device according to an aspect of the first embodiment includes: a vision measurement interface that measures a vision of a user; a display information acquirer that acquires information to be shown; a display image generator that generates a display image showing an image corresponding to the information acquired by the display information acquirer, in accordance with the vision measured by the vision measurement interface; and a projection processor that performs a projection process of projecting the display image generated by the display image generator as a virtual image.

A virtual image display device according to an aspect of the second embodiment includes: a virtual image position selector that selects either a first virtual image position or a second virtual image position as a display position of the virtual image, the second virtual image position being different from the first virtual image position; a vision measurement interface that measures a vision of a user based on a user's response to a vision measurement image projected as a virtual image at the display position selected by the virtual image position selector; a display information acquirer that acquires information to be shown; a display image generator that generates a display image showing an image corresponding to the information acquired by the display information acquirer in a size determined by the vision acquired by the vision measurement interface; and a projection processor that performs a projection process of projecting the display image generated by the display image generator as a virtual image at the display position selected by the virtual image position selector.

Optional combinations of the aforementioned constituting elements, and implementations of the invention in the form of methods, apparatuses, systems, recording mediums, and computer programs may also be practiced as additional modes of the present invention.

BRIEF DESCRIPTION OF DRAWINGS

Embodiments will now be described by way of examples only, with reference to the accompanying drawings which are meant to be exemplary, not limiting and wherein like elements are numbered alike in several Figures in which:

FIG. 4 is a chart showing an exemplary priority level table;

DETAILED DESCRIPTION OF THE PREFERRED EMBODIMENT

Figure 1:
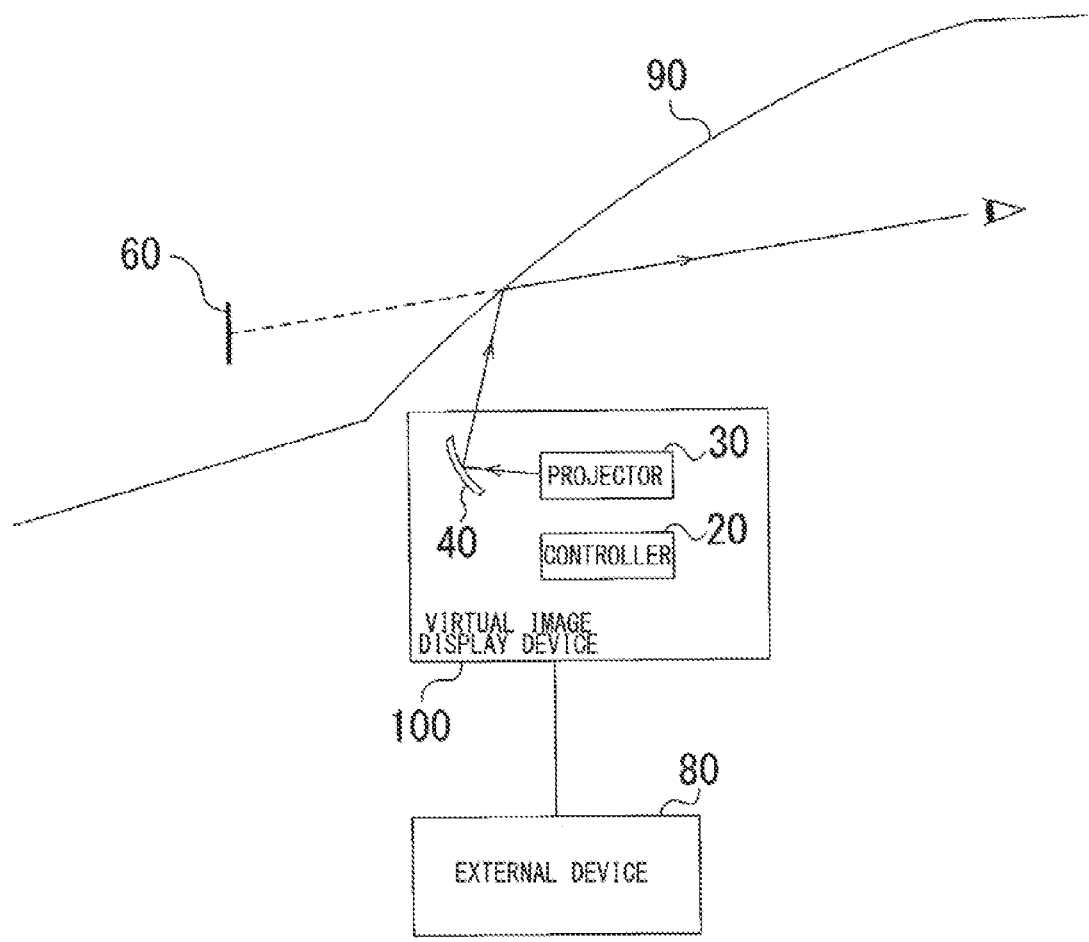
FIG. 1 is a side view schematically showing a configuration of a virtual image display device according to embodiment 1.

The invention will now be described by reference to the preferred embodiments. This does not intend to limit the scope of the present invention, but to exemplify the invention.

Hereinafter, identical or equivalent elements and members shown in the drawings are represented by the same reference symbols, and a description is not duplicated. The dimension of members in the drawings shall be enlarged or reduced as appropriate to facilitate understanding. Some of the members that are not material to the description of the embodiments are omitted in the drawings.

A description will be given of the first invention with reference to FIGS. 1 through 8 based on a preferred embodiment.

Embodiment 1

FIG. 1 is a side view schematically showing a configuration of a virtual image display device 100 according to embodiment 1. For example, the virtual image display device 100 is provided in or on a dashboard below a front glass 90 of a vehicle and displays a virtual image 60 in front of the front glass 90 or a combiner. The virtual image display device 100 is configured such that a projector 30 emits an image display light based on a display image output from a controller 20. A projecting mirror 40 reflects the light and projects the light to the front glass 90 or the combiner. The projected image light is reflected by the front glass 90 or the combiner. The virtual image display device 100 projects the virtual image 60 superimposed on the scenery outside the vehicle in front of the front glass for presentation to the user.

The virtual image display device 100 generates a display image that includes images corresponding to i) vehicle information such as the traveling speed of the vehicle, engine temperature, remaining amount of fuel, etc., ii) outside environment information such as outside temperature, iii) information related to road signs such as the maximum speed, etc. The virtual image display device 100 also generates a display image that includes images corresponding to the current position information and route guidance information acquired from a map display device such as a navigation device provided in the vehicle.

The virtual image display device 100 generates the display image by increasing or decreasing the volume of information included in the display image in accordance with the vision of the user acquired and changing the size of images corresponding to the respective information. The virtual image display device 100 displays the resultant display image as a virtual image. The virtual image display device 100 according to the embodiment described below can be used not only in vehicles but also in aircraft, game machines, amusement facilities, etc. The virtual image display device 100 can also be reduced in size and used as a wearable device.

Figure 2:
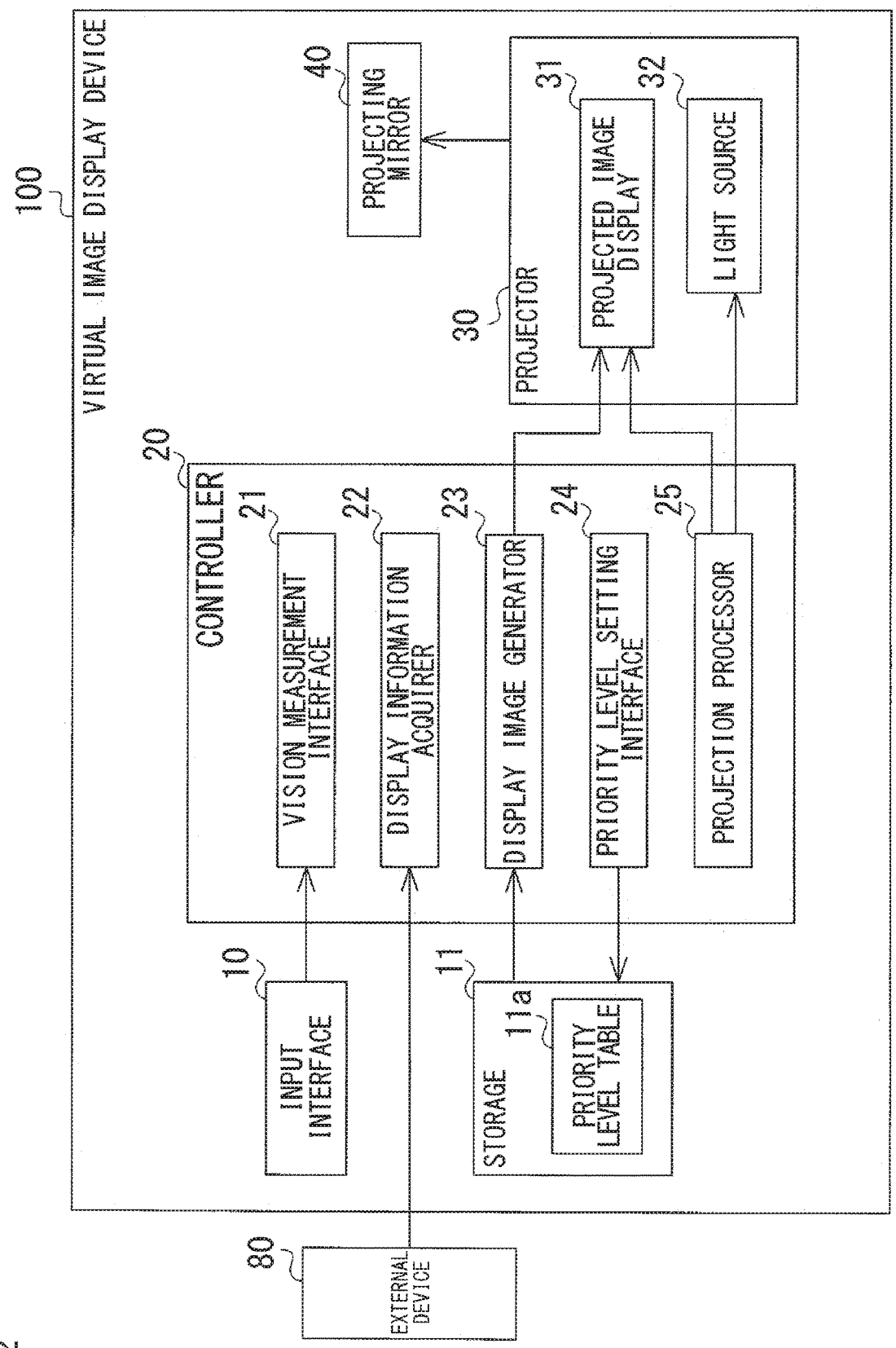
FIG. 2 is a block diagram showing a configuration of the virtual image display device.

FIG. 2 is a block diagram showing a configuration of the virtual image display device 100. The virtual image display device 100 includes an input interface 10, a storage 11, a controller 20, a projector 30, and a projecting mirror 40. The input interface 10 is comprised of a user operation key, a directional key, or a switch such as a touch-sensitive panel and receives a manipulative input of a user. For example, the input interface 10 may be a touch-sensitive panel built in a display device. Alternatively, the input interface 10 may support an input by alternative means such as sound input and gesture input as well as supporting a manipulative input. The storage 11 is comprised of a data storage such as a random access memory (RAM), a flash memory, and a hard disk storage device and stores a priority level table 11a described later.

The controller 20 includes a vision measurement interface 21, a display information acquirer 22, a display image generator 23, a priority level setting interface 24, and a projection processor 25. For example, the controller 20 is comprised of a CPU or the like and performs processes in the respective parts mentioned above in accordance with a computer program stored in a non-volatile memory (not shown) or various information used for the computer program.

The vision measurement interface 21 in the controller 20 acquires the vision of the user by measuring the vision. The vision measurement interface 21 measures the vision of the user by successively displaying vision measurement images (e.g., Landolt rings) generated by the display image generator 23 in front of the front glass 90 as virtual images and acquiring the user's response to each vision measurement image.

A plurality of vision measurement images ranging from those with a small outline dimension to those with a large outline dimension are prepared in association with different levels of vision. For example, the controller 20 displays, as virtual images, vision measurement images associated with the vision 0.3-1.5 successively in front of the front glass 90 and acquires the user's response to each vision measurement image from the input interface 10. In the case of displaying a virtual image of a Landolt ring as a vision measurement image, for example, the user enters a response indicating whether an upper, lower, left, or right slit is recognized in each Landolt ring by using the input interface 10, and the vision measurement interface 21 acquires each response. The vision measurement interface 21 determines whether the user's response to each vision measurement image is right or wrong and acquires the maximum vision for which a right response is obtained as the user's vision. The precision of vision measurement can be increased by various algorithms such as running multiple trials.

The vision measurement interface 21 may acquire the vision entered by the user by using the input interface 10. In this case, it is necessary for the user to know the user's own vision. Even if the user knows the user's own vision through a separate vision test, or the like, however, it is preferred to conduct vision measurement by actually projecting a virtual image in front of the front glass as described above when the vehicle is used, because the vision changes depending on the whether the vehicle is driven by day or by night or depending on the eye fatigue.

The display information acquirer 22 acquires information shown in the virtual image 60 from an external device 80. The information shown is exemplified by vehicle-related information such as the traveling speed of the vehicle, engine temperature, and fuel mileage, ii) information related to outside environment such as outside temperature, iii) information related to road traffic regulation such as the maximum speed, iv) current position information and route guidance information, etc. The external device 80 is exemplified by an electronic control device provided in the vehicle, a map display device such as a car navigation device, a VICS receiver for receiving road traffic information from a vehicle information and communication system (VICS: registered trademark), a vehicle exterior imaging device such as a driver recorder, etc.

The display information acquirer 22 acquires the information related to the vehicle and the information related to outside environment from the electronic control device provided in the vehicle. The display information acquirer 22 acquires the information related to road traffic regulation information, the current position information, and the route guidance information mainly from the map display device but may acquire these items of information from the VICS receiver and the vehicle exterior imaging device if these devices are provided in the vehicle.

Figure 3:
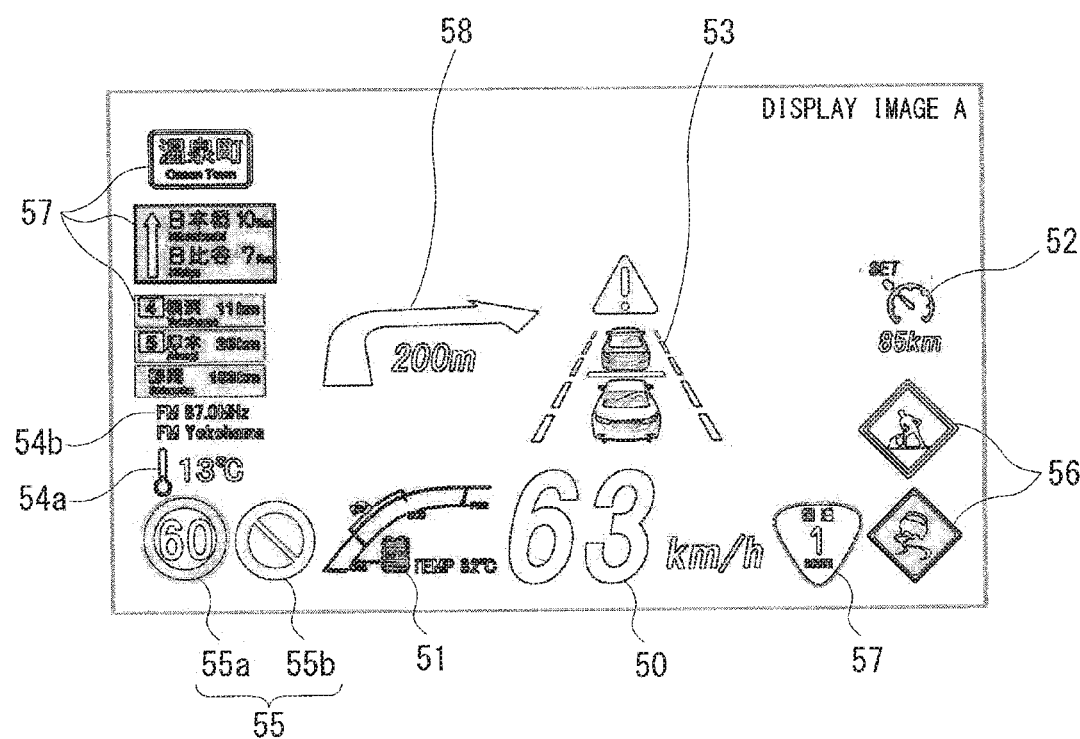
FIG. 3 is a schematic view showing an exemplary display image displayed as a virtual image.

The display image generator 23 generates a display image that includes images corresponding to the respective information input from the display information acquirer 22 and outputs the display image to the projector 30. FIG. 3 is a schematic view showing an exemplary display image displayed as a virtual image, and FIG. 4 is a chart showing an exemplary priority level table 11a. A display image A shown in FIG. 3 is an image having a rectangular area comprised of a predetermined number of pixels in the width and length directions. Image data associated with various information is arranged in the area.

The display image A includes a traveling speed image 50 showing the traveling speed of the vehicle, an engine information image 51 showing the engine temperature, etc., a maintained speed image 52 showing the speed maintained in automatic traveling control, and a collision alert image 53 alerting collision with a vehicle in front. The vehicle information such as the traveling speed, engine information, maintained speed, and collision alert is acquired from the electronic control device provided in the vehicle. The respective information is monitored or controlled in the electronic control device of the speed meter system, engine control system, automatic traveling control system, collision prevention control system, etc. An outside temperature image 54a is generated based on outside temperature information measured by an outside temperature sensor provided in the electronic control device to monitor the outside environment.

The display image A also includes a broadcast station image 54b as intra-vehicle information. Information on broadcast stations from which a broadcast is received is acquired from an audio device. The broadcast station image 54b shows a frequency, channel number, station name of AM broadcast, FM broadcast, television broadcast, etc.

The display image A also includes an image showing information related to road traffic regulation. For example, the display image A shows a regulation sign image 55 such as a maximum speed image 55a and a no parking image 55b, a warning sign image 56 showing that the road is under construction or is slippery, and a guidance sign image 57 showing a national route number, local government, place ahead/distance thereto, etc. Information on a road sign such as a regulation sign, warning sign, and guidance sign included in the display image A is extracted by the map display device as being associated with the current position of the vehicle and is acquired by the display information acquirer 22. Information on a road sign extracted by image analysis from an image captured by the vehicle exterior imaging device provided in the vehicle may be used as the information on a road sign.

The display image A also includes a route guidance image 58 related to route guidance provided by the map display device. The map display device refers to route setting information including a destination entered by the user, a route setting condition, etc. and connects the current position and the destination to produce candidate routes that meet the route setting condition, based on the map data. For example, the route setting condition requires that the traveling time be short, the distance be short, etc. The map display device provides route guidance on a real-time basis so that the vehicle travels according to a set route that the user has selected from the candidate routes produced. The display image generator 23 includes the guidance image 58 in the display image A, based on the route guidance information acquired by the display information acquirer 22 from the map display device. The route guidance image 58 shown in FIG. 3 guides the user to turn right 200 m ahead.

The road traffic information provided by VICS may be acquired from the VICS receiver to display a traffic jam image and a traffic regulation image showing restriction due to a road construction or the like (not shown in FIG. 3).

The display image generator 23 changes the arrangement of the images described above in the area of the display image and also changes the display dimension (size) of the images in accordance with the vision of the user acquired by the vision measurement interface 21. When the vision of the user is low, the display image generator 23 increases the display dimension of each image. When the vision is high, the dimension is decreased. To inhibit the display image as a whole from becoming large when the display dimension of each image is increased, the display image generator 23 selects images included in the display image based on the priority level table 11a stored in the storage 11 and generates the display image by changing the volume of information. When the vision is high, the display image generator 23 increases the volume of information. When the vision is low, the display image generator 23 generates the display image with a smaller volume of information by excluding information having a low priority level. When the vision is low, the display image generator 23 increases the outline dimension of the images by adjusting the relative positions of and changing the arrangement of the images corresponding to the information having a high priority level in the area of the display image including a space created by excluding an image corresponding to the information having a low priority level.

As indicated by the priority level table 11a shown in FIG. 4, priority levels "low", "medium", "high", etc. are defined for the respective information. In the case the vision of the user acquired by the vision measurement interface 21 is high (for example, when the vision is 1.2 or higher), the display image generator 23 generates the display image that includes all of low-priority, medium-priority, and high-priority information shown in FIG. 4. In the case the vision of the user acquired by the vision measurement interface 21 is medium (for example, when the vision is 0.8 or higher and lower than 1.2), the display image generator 23 excludes low-priority information and generates the display image that includes medium-priority and high-priority information. In the case the vision of the user acquired by the vision measurement interface 21 is low (for example, when the vision is lower than 0.8), the display image generator 23 excludes low-priority and medium-priority information and generates the display image that includes high-priority information.

The priority level setting interface 24 acquires the priority level that the user enters by using the input interface 10. The priority level setting interface 24 initializes the priority level table 11a and changes it as needed. The priority level stored in the priority level table 11a may be set by default. In the case the user enters the priority level by using the input interface 10, the display image generator 23 may generate a display image showing the information name, category, and priority level for selection and may project the associated virtual image 60 to allow selection of the priority level.

The projection processor 25 performs a projection process of projecting the display image generated by the display image generator 23 as a virtual image. In the projection process, the projection processor 25 controls the brightness and timing of display of the image displayed by a projected image display 31 described later, the brightness and timing of operation of a light source 32, etc. The projection processor 25 directs the display image generator 23 to output the generated display image to the projected image display 31 and directs the projected image display 31 to display the input display image. The projection processor 25 also controls the brightness of the display image in the projected image display 31 and the brightness of the light source 32, based on information from an illuminance sensor (not shown) or the like.

The projector 30 houses the projected image display 31, the light source 32, an optical system (not shown) comprised of optical lenses, mirrors, etc. The projector 30 generates an image display light based on the display image and projects the image display light. For example, Liquid Crystal On Silicon (LCOS) (reflective liquid crystal display panel), Liquid Crystal Display (LCD) (transmissive liquid crystal panel), or Digital Light Processing (DLP) using a digital mirror device is used for the projected image display 31. The projected image display 31 displays the display image input from the display image generator 23. The image display light generated by the reflection or transmission of the light radiated from the light source 32 is projected to the projecting mirror 40 via the optical system. The brightness and timing of display of the image displayed by the projected image display 31, the brightness and timing of operation of the light source 32, etc. are controlled by the projection processor 25 as described above.

The projected image display 31 may be an image display device comprised of a self-luminous element such as an organic Electro Luminescence (EL) element, a Vacuum Fluorescent Display, or a light-emitting diode (LED). The projector 30 may project light in laser light scanning through a transmissive liquid crystal or a Micro Electro Mechanical Systems (MEMS) mirror.

For example, the projecting mirror 40 is comprised of a concave mirror. The projecting mirror 40 changes the direction of the image display light toward the front glass 90 or the combiner by reflecting the image display light projected from the projector 30.

Figure 5:
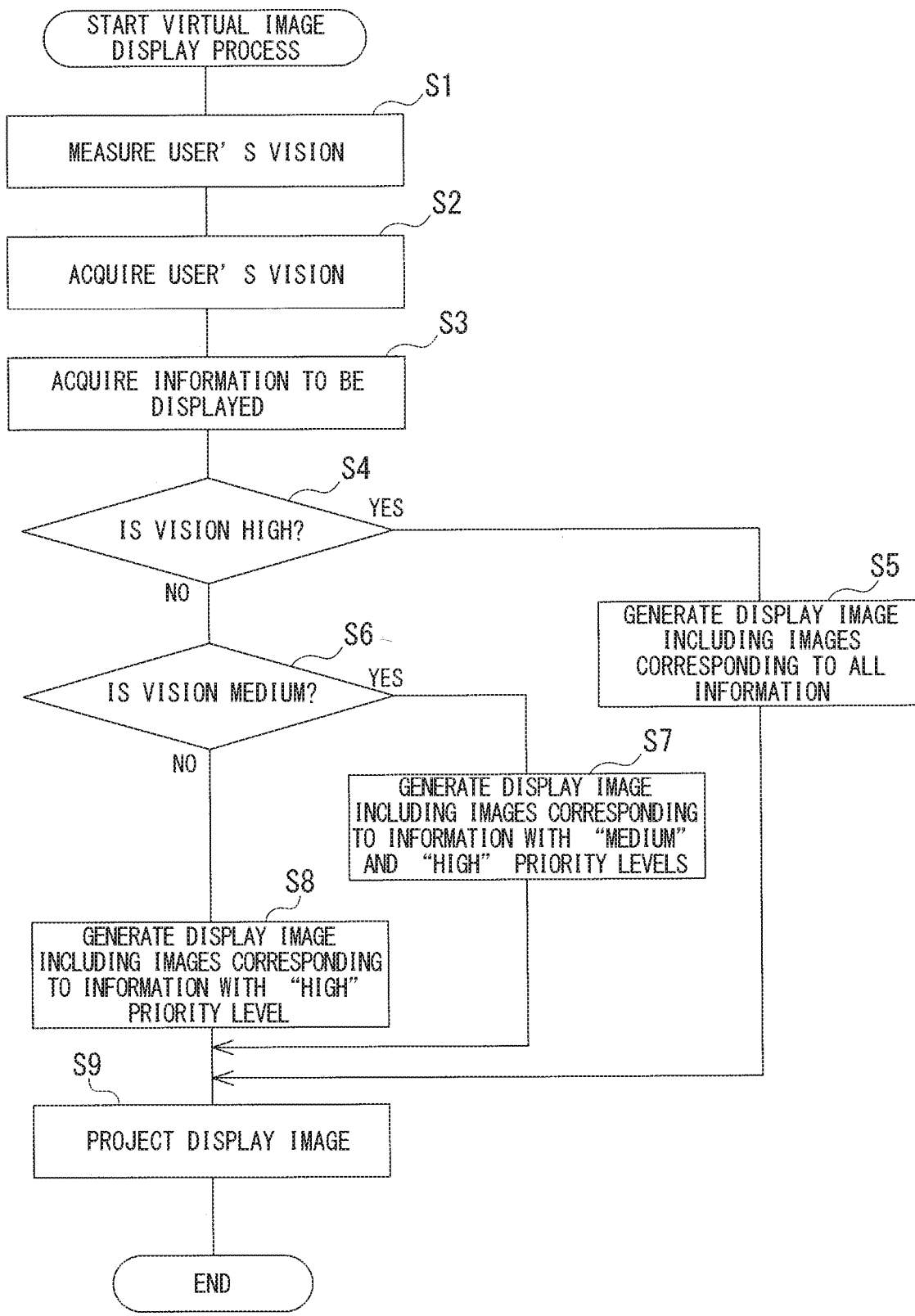
FIG. 5 is a flowchart showing a sequence of steps in the virtual image display process.
Figure 6:
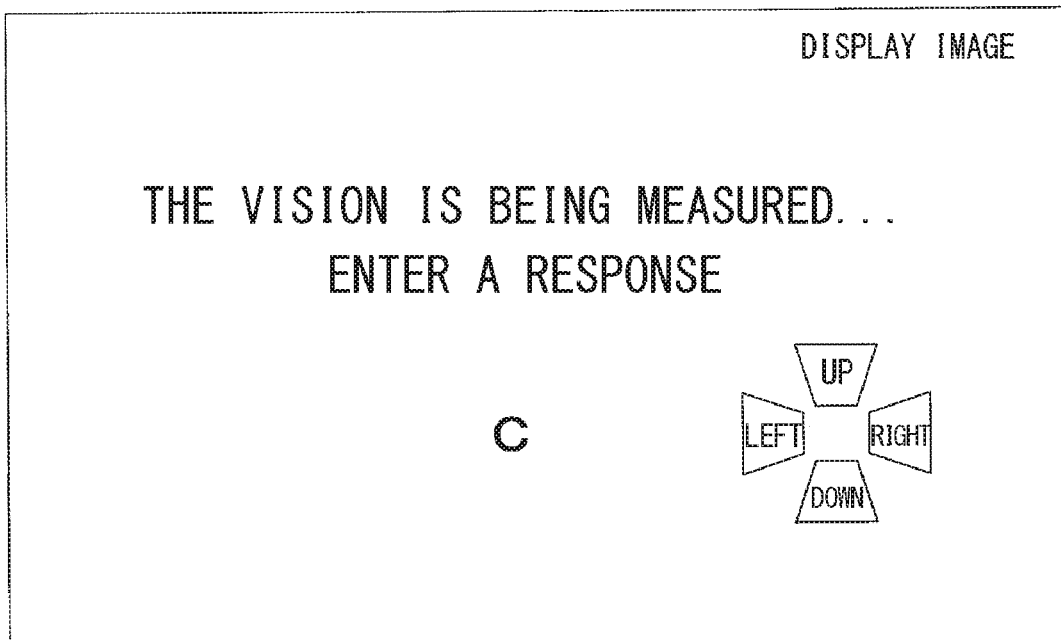
FIG. 6 is a schematic diagram showing an exemplary display image displayed as a virtual image when the vision is measured.

A description will now be given of the operation of the virtual image display device 100 according to the embodiment. FIG. 5 is a flowchart showing a sequence of steps in the virtual image display process. The vision measurement interface 21 of the controller 20 measures the vision of the user based on the vision measurement image (e.g., a Landolt ring) displayed as the virtual image 60 in front of the front glass 90 (S1). FIG. 6 is a schematic diagram showing an exemplary display image displayed as a virtual image when the vision is measured. The display image shown in FIG. 6 includes a Landolt ring as the vision measurement image, a message indicating that the vision is being measured, and a prompt for the user's response.

The user enters the direction of the slit of the Landolt ring by using the input interface 10. The vision measurement interface 21 outputs a signal indicating that a response from the user is acquired from the input interface 10 to the display image generator 23 and the projection processor 25. The display image generator 23 and the projection processor 25 display vision measurement images successively as virtual images. The vision measurement interface 21 determines whether the user's response to each vision measurement image is right or wrong and acquires the maximum vision for which a right response is obtained as the user's vision (S2). The vision measurement interface 21 may acquire the vision entered by the user by using the input interface 10.

The display information acquirer 22 acquires information to be shown as the virtual image 60 from the external device 80 (S3). As described above, the information acquired by the display information acquirer 22 is exemplified by vehicle-related information, information related to outside environment, information related to road traffic regulation, current position information and route guidance information, etc.

The display image generator 23 determines whether the vision measured by the vision measurement interface 21 is high (S4). In the case the display image generator 23 determines that the vision is high (S4: YES), the display image generator 23 generates the display image that includes all information acquired by the display information acquirer 22 (S5). For example, the display image generator 23 determines that the user's vision is high when the vision of the user measured by the vision measurement interface 21 is 1.2 or higher. For example, the display image generated by the display image generator 23 is the display image A shown in FIG. 3 and includes images corresponding to the information defined to have the "low", "medium", and "high" priority levels in the priority level table 11a shown in FIG. 4.

When it is determined that the vision is not high and "NO" is yielded in step S4 (S4: NO), the display image generator 23 determines whether the vision of the user measured by the vision measurement interface 21 is medium or not (S6). When it is determined that the vision is medium in step S6 (S6: YES), the display image generator 23 generates the display image that includes images corresponding to, of the information acquired by the display information acquirer 22, the information defined to have the "medium" and "high"

priority levels in the priority level table 11a, with the information defined to have the "low" priority level being excluded (S7).

Figure 7:
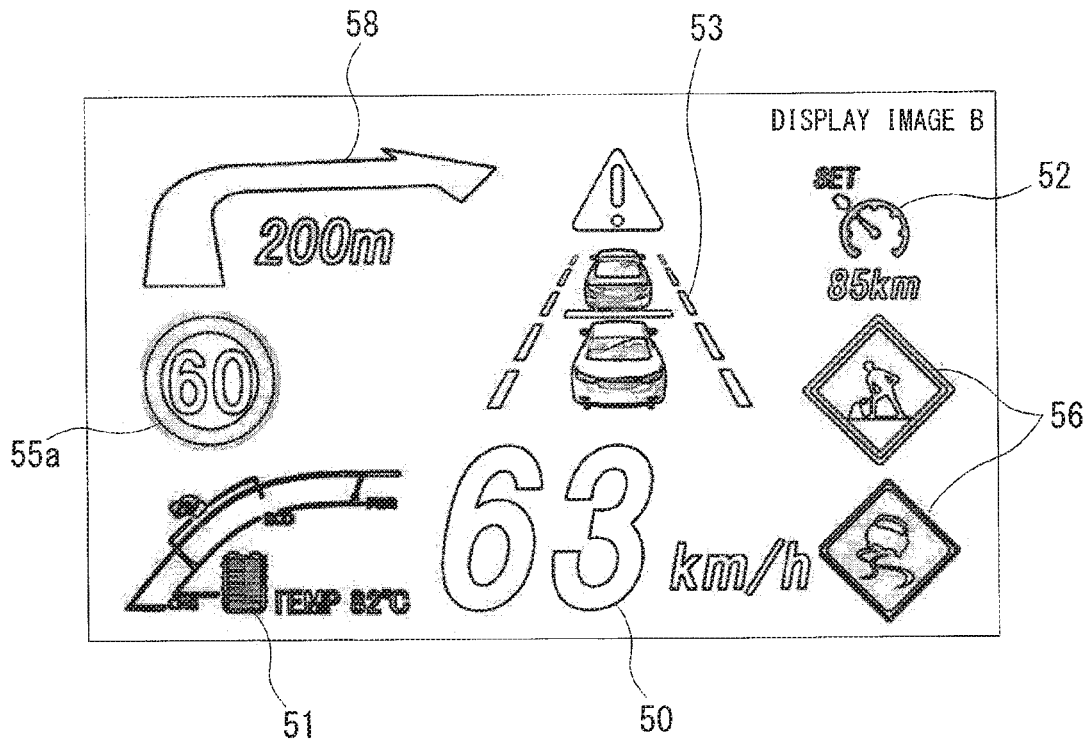
FIG. 7 is a schematic diagram showing an exemplary display image displayed as a virtual image in accordance with the vision.

In the case the vision of the user measured by the vision measurement interface 21 is 0.8 or higher and lower than 1.2, for example, the display image generator 23 determines that the vision is medium. FIG. 7 is a schematic diagram showing an exemplary display image displayed as a virtual image in accordance with the vision. For example, the display image generator 23 displays a display image B shown in FIG. 7 when the user's vision is medium. The display image B includes, as vehicle information, a traveling speed image 50, an engine information image 51, a maintained speed image 52, and a collision alert image 53. As regulation information, a maximum speed image 55a and a warning sign image 56 are included. As route guidance information, a route guidance image 58 is included.

Figure 8:
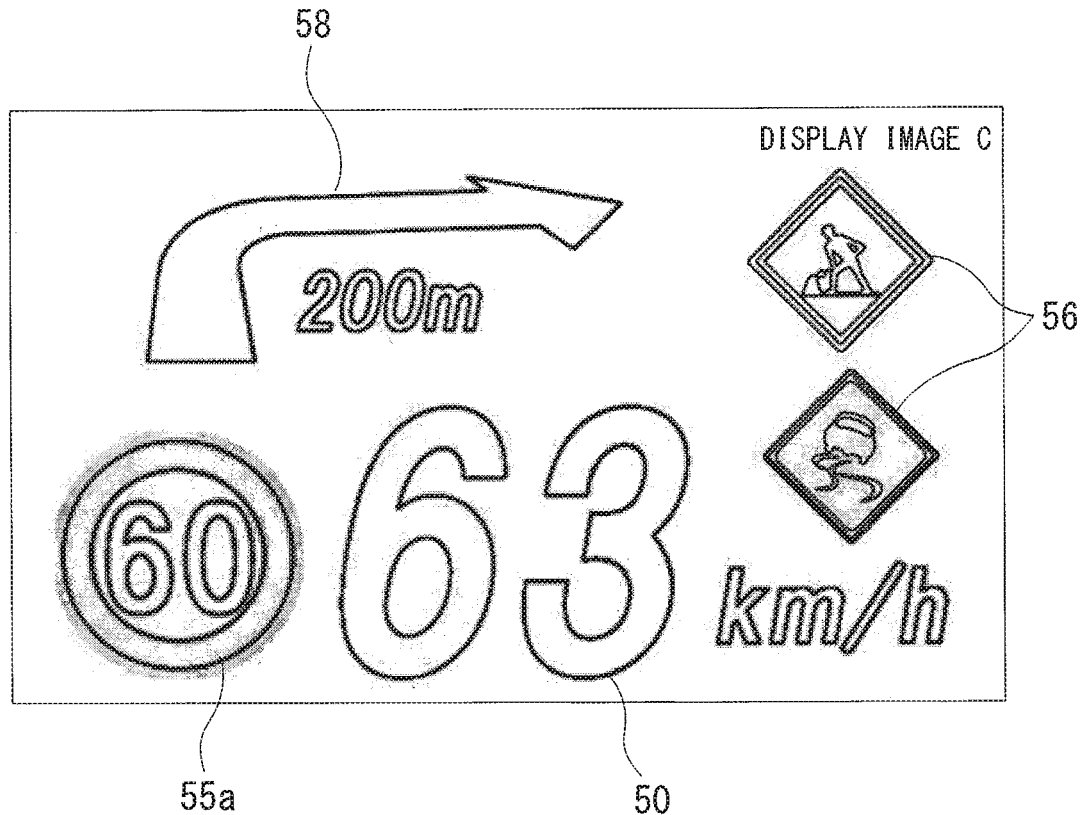
FIG. 8 is a schematic diagram showing an exemplary display image displayed as a virtual image in accordance with the vision.

When it is determined that the vision is not medium and "NO" is yielded in step S6 (S6: NO), the display image generator 23 determines that the vision measured by the vision measurement interface 21 is low and generates the display image that includes images corresponding to, of the information acquired by the display information acquirer 22, the information defined to have the "high" priority level in the priority level table 11a, with the information defined to have the "low" and "medium" priority level being excluded. In this case, the display image generator 23 is determining, for example, that the user's vision is lower than 0.8. FIG. 8 is a schematic diagram showing an exemplary display image displayed as a virtual image in accordance with the vision. For example, the display image generator 23 displays a display image C shown in FIG. 8 when the user's vision is low. The display image C includes, as vehicle information, a traveling speed image 50. As regulation information, a maximum speed image 55a and a warning sign image 56 are included. As route guidance information, a route guidance image 58 is included.

The display image generator 23 can enhance the visibility of the display image by changing the size of the respective images corresponding to vehicle-related related information, information related to outside environment, information related to road traffic regulation, current position information and route guidance information, etc. in accordance with the vision of the user. The display image generator 23 generates the display image by changing the volume of information based on the priority level table 11a. By generating the display image such that the volume of information is increased when the vision is high and the information having a lower priority level is excluded when the vision is low, the display image generator 23 can enhance the visibility of the display image.

The priority levels of the respective information in the priority level table 11a can be changed by causing the priority level setting interface 24 to acquire the priority level entered by the user in the input interface 10.

Therefore, information required by the user can be preferentially displayed as the virtual image 60.

The vision measurement interface 21 acquires the user's response to the vision measurement image projected in front of the front glass 90 as the virtual image 60, determines whether the user's response is right or wrong, and, accordingly, acquires the maximum vision for which a right response is obtained as the user's vision. The virtual image display device 100 can acquire the vision at the onset of driving by measuring the vision before the user on board the vehicle starts driving the vehicle and so can enhance the visibility of the display image in accordance with the vision that varies depending on the whether the vehicle is driven by day or by night, the eye fatigue, or the like.

A description will now be given of the features of the virtual image display device 100, the virtual image display method, and virtual image display program according to embodiment 1. The virtual image display device 100 includes the vision measurement interface 21, the display information acquirer 22, the display image generator 23, and the projection processor 25. The vision measurement interface 21 measures the vision of the user, and the display information acquirer 22 acquires information to be shown. The display image generator 23 generates the display image showing images corresponding to the information acquired by the display information acquirer 22 in accordance with the vision measured by the vision measurement interface 21. The projection processor 25 performs a projection process of projecting the display image generated by the display image generator 23 as a virtual image. This allows the virtual image display device 100 to display an image suited to the vision and so can enhance the visibility of the display image.

The display image generator 23 changes the display dimension of the image corresponding to the information acquired by the display information acquirer 22 in accordance with the vision measured by the vision measurement interface 21. This allows the virtual image display device 100 to enhance the visibility of the display image by decreasing the size of the image when the vision is high and increasing the size of the image when the vision is low.

The display image generator 23 also changes the volume of information included in the display image in accordance with the vision measured by the vision measurement interface 21. This allows the virtual image display device 100 to enhance the visibility of the display image by increasing the volume of information when the vision is high and decreasing the volume of information when the vision is low.

The priority level setting interface 24 sets the priority level of the information acquired by the display information acquirer 22. The display image generator 23 changes the volume of information included in the display image based on the priority level set. This allows the virtual image display device 100 to enhance the visibility of the display image by generating the display image with the information having a low priority level being excluded when the vision is low.

The vision measurement interface 21 also measures the vision based on the user's response to the vision measurement image projected as a virtual image. This allows the virtual image display device 100 to measure the vision of the user on board the vehicle. By measuring the vision before the user starts driving the vehicle, the vision at the onset of driving can be measured.

The vision measurement interface 21 measure the vision at the onset of vehicle driving. By measuring the vision before the user starts driving the vehicle, the virtual image display device 100 can enhance the visibility of the display image in accordance with the vision at the onset of driving.

As shown in a variation described later, the display image generator 23 generates the display image based on the user's input in response to a display image of a color sample projected as a virtual image. This allows the virtual image display device 100 to further enhance the visibility by generating the display image with the color of the image shown in the display image being changed.

The virtual image display method includes a vision measurement step, a display information acquisition step, a display image generation step, and a projection process step. The vision measurement step measures the vision of the user, and the display information acquisition step acquires information to be shown. The display image generation step generates the display image showing the image corresponding to the information acquired by the display information acquisition step in accordance with the vision measured by the vision measurement step. The projection process step performs a projection step of projecting the display image generated by the display image generation step as a virtual image. According to this virtual image display method, an image suited to the vision is displayed so that the visibility of the display image is enhanced.

The virtual image display program includes computer-implemented modules including a vision measurement module, a display information acquisition module, a display image generation module, and a projection process module. The vision measurement module measures the vision of the user, and the display information acquisition module acquires information to be shown. The display image generation module generates the display image showing the image corresponding to the information acquired by the display information acquisition module in accordance with the vision measured by the vision measurement module. The projection process module performs a projection step of projecting the display image generated by the display image generation module as a virtual image. According to this virtual image display program, an image suited to the vision is displayed so that the visibility of the display image is enhanced.

A description will be given of the second invention with reference to FIGS. 9 through 13 based on a preferred embodiment.

Embodiment 2

Figure 9:
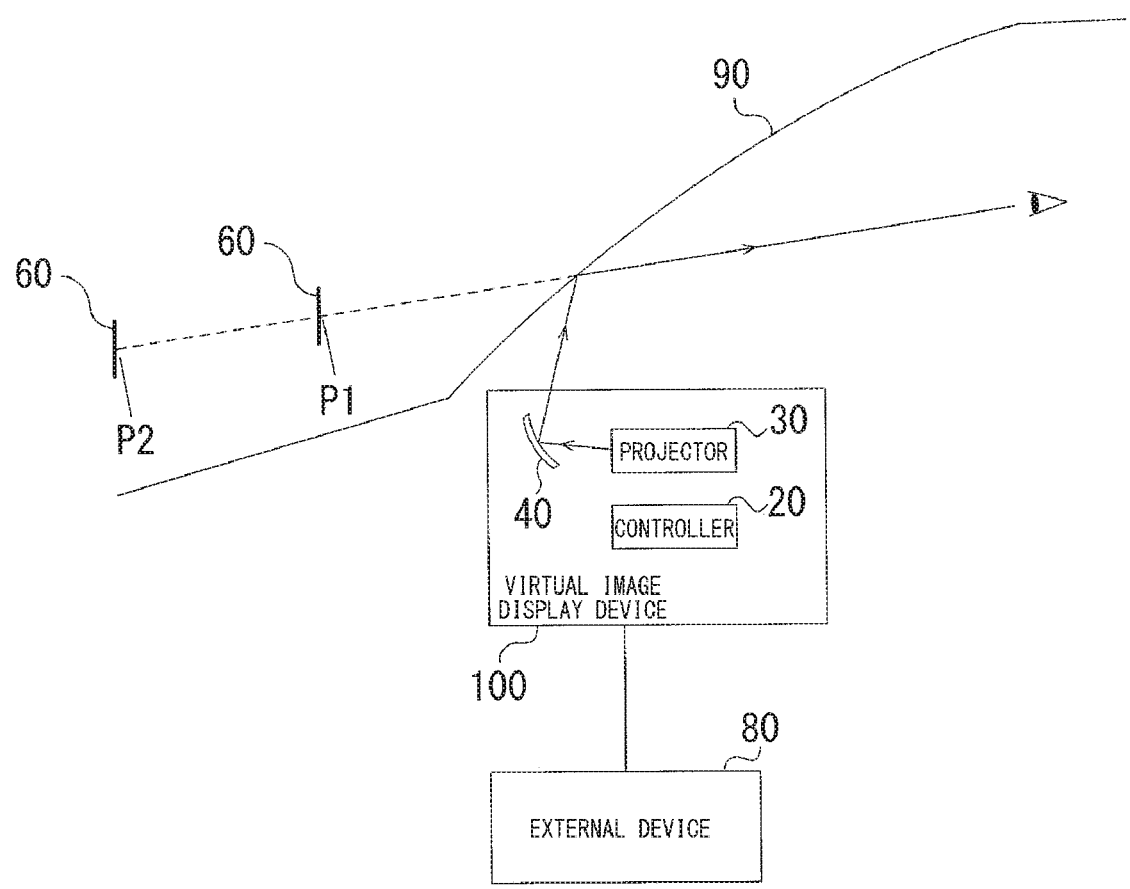
FIG. 9 is a side view schematically showing a configuration of a virtual image display device according to embodiment 2.

FIG. 9 is a side view schematically showing a configuration of a virtual image display device 100 according to embodiment 2. For example, the virtual image display device 100 is provided in or on a dashboard below a front glass 90 of a vehicle and displays a virtual image 60 at a first virtual image position P1 or a second virtual image position P2 in front of the front glass 90 or a combiner. The second virtual image position P2 is different from the first virtual image position P1 and is more distanced than the first virtual image position P1. The virtual image display device 100 is configured such that a projector 30 emits an image display light based on a display image output from a controller 20. A projecting mirror 40 reflects the light and projects the light to the front glass 90 or the combiner. The projected image light is reflected by the front glass 90 or the combiner. The virtual image display device 100 projects the virtual image 60 superimposed on the scenery outside the vehicle in front of the front glass for presentation to the user.

The virtual image display device 100 generates a display image that includes images corresponding to i) vehicle information such as the traveling speed of the vehicle, engine temperature, remaining amount of fuel, etc., ii) outside environment information such as outside temperature, iii) information related to road signs such as the maximum speed, etc. The virtual image display device 100 also generates a display image that includes images corresponding to the current position information and route guidance information acquired from a map display device such as a navigation device provided in the vehicle.

The virtual image display device 100 displays the display image by increasing or decreasing the volume of information included in the display image in accordance with the vision of the user measured and changing the size of images corresponding to the respective information. The virtual image display device 100 displays the resultant display image as a virtual image. The virtual image display device 100 according to the embodiment described below can be used not only in vehicles but also in aircraft, game machines, amusement facilities, etc. The virtual image display device 100 can be reduced in size and used as a wearable device.

Figure 10:
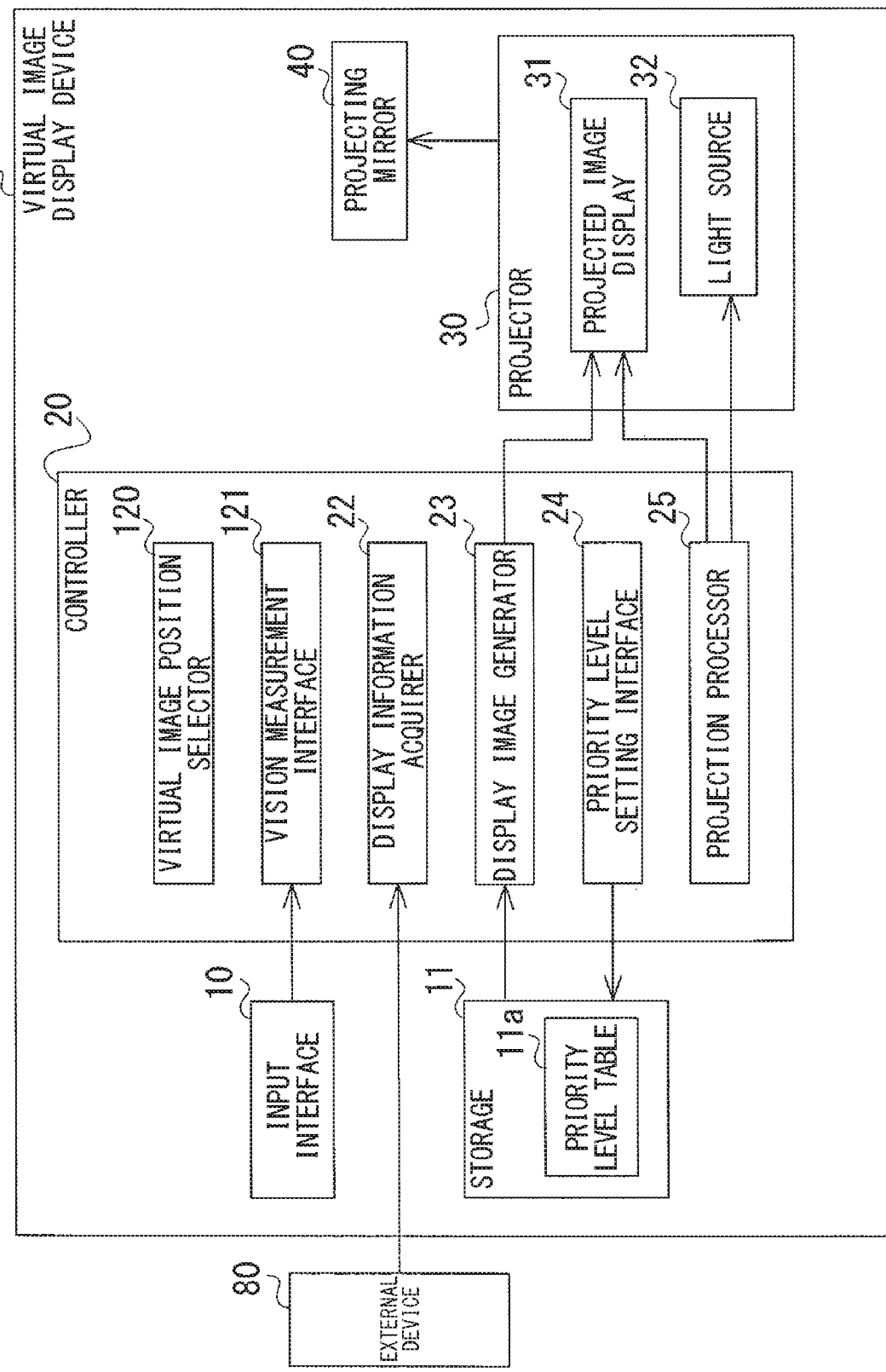
FIG. 10 is a block diagram showing a configuration of the virtual image display device.

FIG. 10 is a block diagram showing a configuration of the virtual image display device 100. The virtual image display device 100 includes an input interface 10, a storage 11, a controller 20, a projector 30, and a projecting mirror 40. The configuration of the input interface 10 and the storage 11 is the same as that of embodiment 1 so that an explanation is omitted for brevity of the description.

The controller 20 includes a virtual image position selector 120, a vision measurement interface 121, a display information acquirer 22, a display image generator 23, a priority level setting interface 24, and a projection processor 25. For example, the controller 20 is comprised of a CPU or the like and performs processes in the respective parts mentioned above in accordance with a computer program stored in a non-volatile memory (not shown) or various information used for the computer program. The display information acquirer 22, the display image generator 23, the priority level setting interface 24, and the projection processor 25, the projector 30, and the projecting mirror 40 have the feature identical to the respective parts denoted by the same references in embodiment 1 and function identically, unless otherwise specified below.

The virtual image position selector 120 in the controller 20 selects either the first virtual image position P1 or the second virtual image position P2 as the display position of the virtual image, the second virtual image position P2 being different from the first virtual image position P1 and more distanced than the first virtual image position P1 (see FIG. 9). The virtual image position selector 120 may select two or more display positions of the virtual image. Alternatively, the display position may be an arbitrary position that can be changed continuously from P1 to P2. For example, the first virtual image position P1 may be set at a position at a distance of 3 m from the viewpoint position of the user, and the second virtual image position P2 may be set at a position of 5 m. The display position of the virtual image may not be limited to these examples.

The vision measurement interface 121 measures the vision of the user at the display position of the virtual image selected by the virtual image position selector 120. Vision measurement images (e.g., a Landolt ring) generated by the display image generator 23 are successively displayed at the display position of the virtual image (the first virtual image position P1 or the second virtual image position P2) in front of the front glass 90 as virtual images. The vision measurement interface 121 measures the vision of the user by acquiring the user's response to each vision measurement image from the input interface 10.

A plurality of vision measurement images ranging from those with a small outline dimension to those with a large outline dimension are prepared in association with different levels of vision. For example, the controller 20 displays, as virtual images, vision measurement images associated with the vision 0.3-1.5 successively in front of the front glass 90 and acquires the user's response to each vision measurement image from the input interface 10. In the case of displaying a virtual image of a Landolt ring as a vision measurement image, for example, the user enters a response indicating whether an upper, lower, left, or right slit is recognized in each Landolt ring by using the input interface 10, and the vision measurement interface 121 acquires each response. The vision measurement interface 121 determines whether the user's response to each vision measurement image is right or wrong and acquires the maximum vision for which a right response is obtained as the user's vision. The precision of vision measurement can be increased by various algorithms such as running multiple trials.

When the vision of the user measured at one of the display positions (the first virtual image position P1 or the second virtual image position P2) is low and is equal to or below a predetermined threshold value, the vision measurement interface 121 outputs a signal indicating selection of the other display position to the virtual image position selector 120. The vision measurement interface 121 measures the vision of the user at the other display position. When the vision is higher than a predetermined threshold value, the vision measurement interface 121 maintains the selection of the other display position by the virtual image position selector 120. When the vision of the user measured at the other display position is equal to or below the predetermined threshold value, the vision measurement interface 121 outputs a signal indicating selection of the display position (the first virtual image position P1 or the second virtual image position P2) at which the vision is better to the virtual image position selector 120. Alternatively, the vision measurement interface 121 may cause the virtual image position selector 120 to select the first virtual image position P1 and the second virtual image position P2 successively to measure the vision at both display positions and output a signal indicating selection of the display position at which the vision is better to the virtual image position selector 120.

Figure 11:
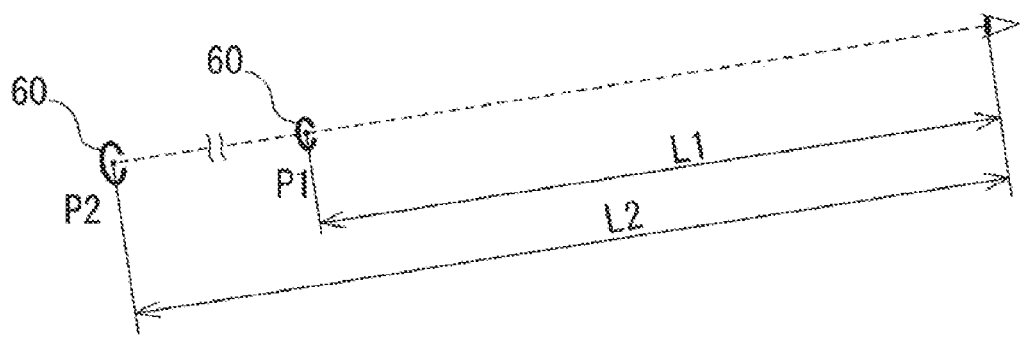
FIG. 11 is a schematic diagram showing sizes of vision measurement images.

FIG. 11 is a schematic diagram showing sizes of vision measurement images. The display image generator 23 generates images showing vision measurement images associated with the same vision and displayed at the first virtual image position P1 and the second virtual image position P2, respectively, in sizes that vary in accordance with the distance from the viewpoint position of the user. The vision measurement images are sized such that the larger the distance from the viewpoint position of the user, the larger the dimension. The viewpoint position of the user may differ from one individual to another, but a typical position may be defined, allowing for a certain error. Alternatively, the distance from the viewpoint position of the user may be adjusted for each user.

The outline dimension of the vision measurement image displayed at the second virtual image position P2 is defined to have a value derived by multiplying a ratio (L2/L1) of a distance L2 from the viewpoint position to the second virtual image position P2 to a distance L1 to the first virtual image position P1 by the outline dimension of the vision measurement image displayed at the first virtual image position P1. In this way, the vision measurement images for measuring the same vision at the first virtual image position P1 and the second virtual image position p2 can be generated. Given, for example, that the distance from the viewpoint position to the first virtual image position P1 is 2 m and the distance to the second virtual image position P2 is 4 m, the outline dimension of the vision measurement image displayed at the second virtual image position P2 may be double the outline dimension of the vision measurement image displayed at the first virtual image position P1.

The display information acquirer 22, the display image generator 23, and the priority level setting interface 24 are configured like those parts described in embodiment 1 and denoted by the same references. The display image shown by way of example in FIG. 3 is generated, and the priority level table 11a shown by way of example in FIG. 4 is used.

The projection processor 25 performs a projection process of projecting the display image generated by the display image generator 23 as a virtual image at the display position selected by the virtual image position selector 120. The projection processor 25 changes the display position of the virtual image to the first virtual image position P1 or the second virtual image position P2 by bringing the position of the image (intermediate image) displayed by the projected image display 31 described later near or away from the projecting mirror 40, or by bringing the position of the lens provided between the intermediate image and the projecting mirror 40 near or away the projecting mirror 40. A publicly known method can be used to changing the display position of the virtual image to the first virtual image position P1 or the second virtual image position P2 or to a position therebetween so that an explanation thereof is omitted for brevity of the description.

In the projection process, the projection processor 25 controls the brightness and timing of display of the image displayed by the projected image display 31, the brightness and timing of operation of the light source 32, etc. The projection processor 25 directs the display image generator 23 to output the generated display image to the projected image display 31 and directs the projected image display 31 to display the input display image. The projection processor 25 also controls the brightness of the display image in the projected image display 31 and the brightness of the light source 32, based on information from an illuminance sensor (not shown) or the like.

The projector 30 houses the projected image display 31, the light source 32, an optical system (not shown) comprised of optical lenses, mirrors, etc., which are configured like those parts described in embodiment 1 and denoted by the identical references. The projector 30 displays the display image input from the display image generator 23, using the projected image display 31. The projector 30 projects the image display light generated by the reflection or transmission of the light radiated from the light source 32 to the projecting mirror via the optical system. The projected image display 31 also includes a drive system for bringing the position of the intermediate image or the position of the lens provided between the intermediate image and the projecting mirror 40 near or away from the projecting mirror 40, and the drive system is controlled by the projection processor 25.

Figure 12:
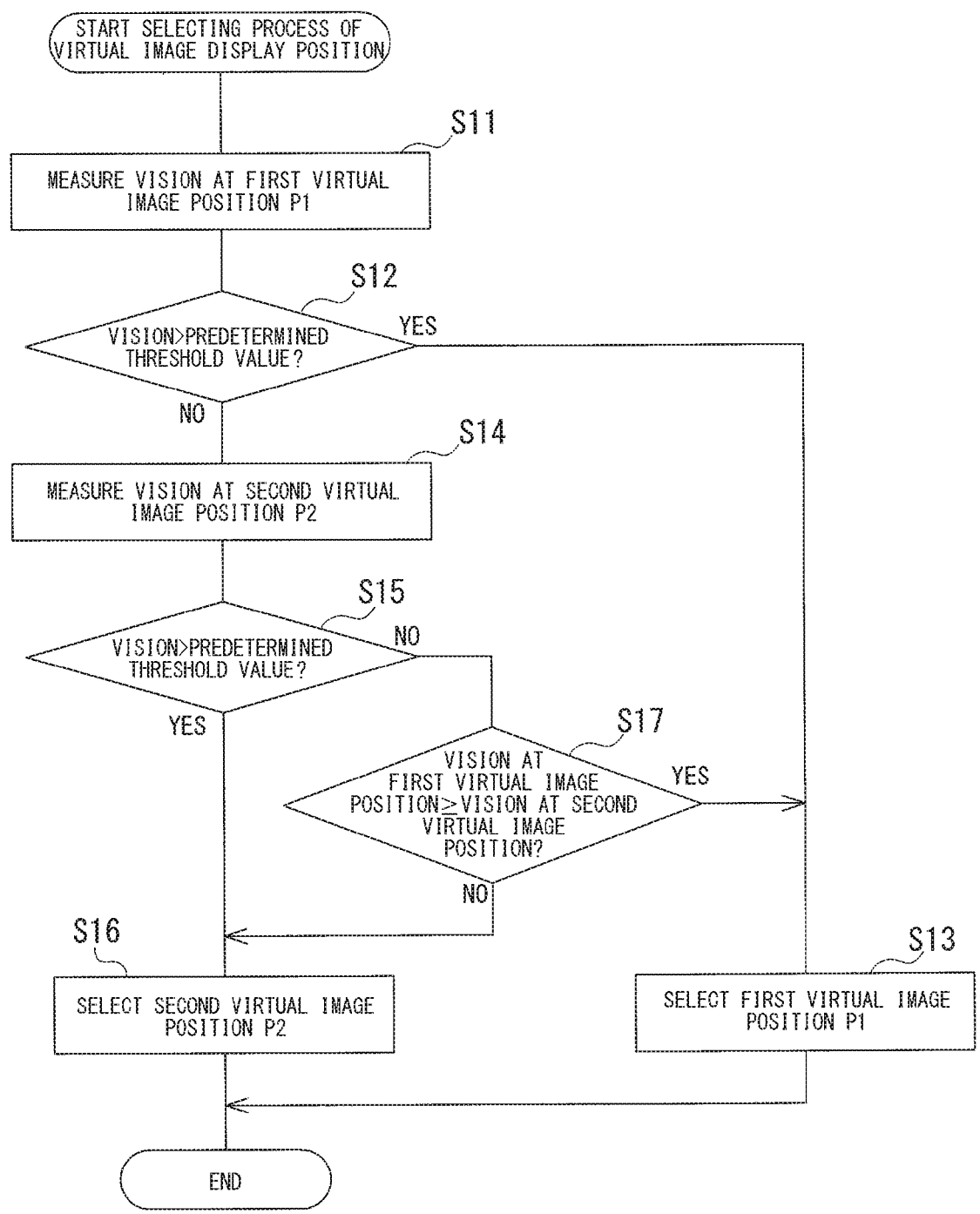
FIG. 12 is a flowchart showing a sequence of steps in the process of selecting the virtual image position.

A description will now be given of the operation of the virtual image display device 100 according to embodiment 2, based on the process of selecting the virtual image position and the process of displaying the virtual image. FIG. 12 is a flowchart showing a sequence of steps in the process of selecting the virtual image position. It is assumed that the virtual image position selector 120 is selecting the first virtual image position P1 when the process of selecting the virtual image position is started. The vision measurement interface 121 measures the vision of the user based on the vision measurement image (e.g., a Landolt ring) displayed as the virtual image 60 at the first virtual image position P1 in front of the front glass 90 (S11). An example of the display image displayed as the virtual image when the vision is measured is as shown in FIG. 6. The display image shown in FIG. 6 includes a Landolt ring as the vision measurement image, a message indicating that the vision is being measured, and a prompt for the user's response.

The user enters the direction of the slit of the Landolt ring by using the input interface 10. The vision measurement interface 121 outputs a signal indicating that a response from the user is acquired from the input interface 10 to the display image generator 23 and the projection processor 25. The display image generator 23 and the projection processor 25 display vision measurement images successively as virtual images. The vision measurement interface 121 determines whether the user's response to each vision measurement image is right or wrong and acquires the maximum vision for which a right response is obtained as the user's vision. The vision measurement interface 121 may acquire the vision entered by the user by using the input interface 10.

The vision measurement interface 121 determines whether the measured vision is higher than a predetermined threshold value (e.g., 1.0) (S12). When the vision is higher than the predetermined threshold value (S12: YES), the vision measurement interface 121 selects the first virtual image position P1 as the display position (S13) and terminates the process. When the measured vision is determined to be equal to or lower than the predetermined threshold value in step S12 (S12: NO), the vision measurement interface 121 causes the virtual image position selector 120 to select the second virtual image position P2 and measures the vision of the user (S14).

The vision measurement interface 121 determines whether the measured vision is higher than a predetermined threshold value (e.g., 1.0) (S15). When the vision is higher than the predetermined threshold value (S15: YES), the vision measurement interface 121 selects the second virtual image position P2 as the display position (S16) and terminates the process. When the measured vision is determined to be equal to or lower than the predetermined threshold value in step S15 (S15: NO), the vision measurement interface 121 determines whether the vision at the first virtual image position P1 is equal to or higher than the vision at the second virtual image position P2 (S17). When the vision at the first virtual image position P1 is equal to or higher than the vision at the second virtual image position P2 (S17: YES), the vision measurement interface 121 makes a transition to step S13, selects the first virtual image position P1 as the display position, and terminates the process. When the vision at the first virtual image position P1 is lower than the vision at the second virtual image position P2 (S17: NO), the vision measurement interface 121 makes a transition to step S16, selects the second virtual image position P2 as the display position, and terminates the process.

Through this process of selecting the virtual image position, the virtual image position selector 120 can select the display position (the first virtual image position P1 or the second virtual image position P2) at which the vision is better. Further, the vision measurement interface 121 can also acquire the vision at the display position of the virtual image selected by the virtual image position selector 120 through the measurement. Further, the display image generator 23 generates images showing vision measurement images associated with the same vision and displayed at the first virtual image position P1 and the second virtual image position P2, respectively, in sizes that vary in accordance with the distance from the viewpoint position of the user. This makes it possible to compare the vision of the user at the first virtual image position P1 with that of the second virtual image position P2.

Figure 13:
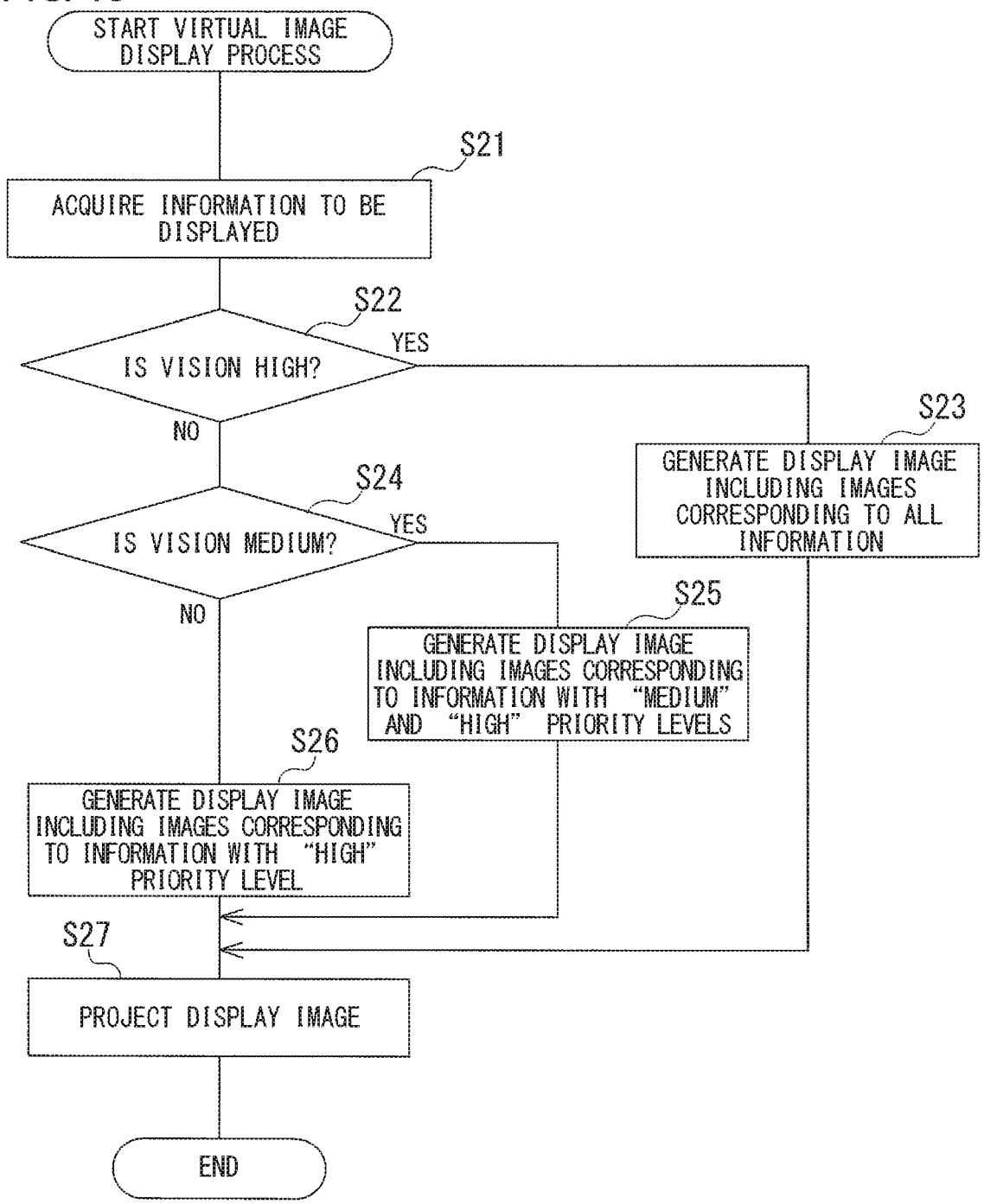
FIG. 13 is a flowchart showing a sequence of steps in the virtual image display process.

FIG. 13 is a flowchart showing a sequence of steps in the virtual image display process. It is assumed that the virtual image position selector 120 in the controller 20 is selecting the first virtual image position P1 or the second virtual image position P2 at the start of the virtual image display process through the process of selecting the virtual image position described above. It is also assumed that the vision measurement interface 121 has measured the vision of the user through the process of selecting the virtual image position described above. The display information acquirer 22 acquires information displayed as the virtual image 60 from the external device 80 (S21). As described in embodiment 1, the information acquired by the display information acquirer 22 is exemplified by vehicle-related information, information related to outside environment, information related to road traffic regulation, current position information and route guidance information, etc.

The steps from step S22 through step S27 are the same as the steps from step S4 through step S9 in FIG. 5 of embodiment 1 so that an explanation thereof is omitted for brevity of the description. Through the steps from step S22 through step S27, the display image as shown in FIGS. 3, 7, and 8 is generated in accordance with the vision of the user.

The display image generator 23 can enhance the visibility of the display image by changing the size of respective images corresponding to vehicle-related related information, information related to outside environment, information related to road traffic regulation, current position information and route guidance information, etc. in accordance with the vision of the user. The display image generator 23 generates the display image by changing the volume of information based on the priority level table 11a. By generating the display image such that the volume of information is increased when the vision is high and the information having a lower priority level is excluded when the vision is low, the display image generator 23 can enhance the visibility of the display image.

The priority levels of the respective information in the priority level table 11a can be changed by causing the priority level setting interface 24 to acquire the priority level entered by the user in the input interface 10. Therefore, information required by the user is preferentially displayed as the virtual image 60.

The vision measurement interface 121 acquires the user's response to the vision measurement image projected in front of the front glass 90 as the virtual image 60, determines whether the user's response is right or wrong, and, accordingly, acquires the maximum vision for which a right response is obtained as the user's vision. The virtual image display device 100 can acquire the vision at the onset of driving by measuring the vision before the user on board the vehicle starts driving the vehicle and so can enhance the visibility of the display image in accordance with the vision that varies depending on the whether the vehicle is driven by day or by night, the eye fatigue, etc.

A description will now be given of the features of the virtual image display device 100, the virtual image display method, and virtual image display program according to embodiment 2. The virtual image display device 100 includes the virtual image position selector 120, the vision measurement interface 121, the display information acquirer 22, the display image generator 23, and the projection processor 25. The virtual image position selector 120 selects either the first virtual image position P1 or the second virtual image position P2 as the display position of the virtual image, the second virtual image position P2 being different from the first virtual image position P1. The vision measurement interface 121 measures the vision based on the user's response to the vision measurement image projected as the virtual image at the display position selected by the virtual image position selector 120. The display information acquirer 22 acquires information to be shown. The display image generator 23 generates the display image showing images corresponding to the information acquired by the display information acquirer 22 in sizes determined by the vision measured by the vision measurement interface 121. The projection processor 25 performs a projection process of projecting the display image generated by the display image generator 23 as a virtual image at the display position selected by the virtual image position selector 120. This allows the virtual image display device 100 to select a distance at which the virtual image is displayed and so can enhance the visibility of the display image for the user.

Further, the sizes of the vision measurement images displayed at the first virtual image position P1 and the second virtual image position P2 are made to vary in accordance with the distance from the viewpoint position of the user. Accordingly, it is possible to compare the vision of the user at the first virtual image position P1 with that of the second virtual image position P2.

The larger the distance from the viewpoint position of the user, the larger the dimension of the vision measurement image. Accordingly, it is possible to compare the vision of the user at the first virtual image position P1 with that of the second virtual image position P2.

When the vision of the user measured at one of the display positions (the first virtual image position P1 or the second virtual image position P2) is equal to or lower than a predetermined threshold value, the virtual image position selector 120 selects the other display position. The vision measurement interface 121 measures the vision of the user based on the user's response to the vision measurement image projected as the virtual image at the other display position. By measuring the vision of the user at the second virtual image position P2 when the vision at the first virtual image position P1 is equal to or lower than a predetermined threshold value, it is possible to determine which of the first virtual image position P1 and the second virtual image position P2 should be the display position of the virtual image by making a comparison.

The display image generator 23 also changes the volume of information included in the display image in accordance with the vision measured by the vision measurement interface 21. This allows the virtual image display device 100 to enhance the visibility of the display image by increasing the volume of information when the vision is high and decreasing the volume of information when the vision is low.

The priority level setting interface 24 sets the priority level of the information acquired by the display information acquirer 22. The display image generator 23 changes the volume of information included in the display image based on the priority level set. This allows the virtual image display device 100 to enhance the visibility of the display image by generating the display image with the information having a low priority level being excluded when the vision is low.

The virtual image display method includes a virtual image position selection step, a vision measurement step, a display information acquisition step, a display image generation step, and a projection process step. The virtual image position selection step selects either the first virtual image position P1 or the second virtual image position P2 as the display position of the virtual image, the second virtual image position P2 being different from the first virtual image position P1. The vision measurement step measures the vision of the user based on the user's response to the vision measurement image projected as a virtual image at the display position selected by the virtual image position selection step. The display information acquisition step acquires information to be shown. The display image generation step generates the display image showing images corresponding to the information acquired by the display information acquisition step in sizes determined by the vision measured by the vision measurement step. The projection process step performs a projection step of projecting the display image generated by the display image generation step as a virtual image at the display position selected by the virtual image position selection step. According to this virtual image display method, it is possible to select a distance at which the virtual image is displayed and enhance the visibility of the display image for the user.

The virtual image display program includes computer-implemented modules including a virtual image position selection module, a vision measurement module, a display information acquisition module, a display image generation module, and a projection process module. The virtual image position selection module selects either the first virtual image position P1 or the second virtual image position P2 as the display position of the virtual image, the second virtual image position P2 being different from the first virtual image position P1. The vision measurement module measures the vision of the user based on the user's response to the vision measurement image projected as a virtual image at the display position selected by the virtual image position selection module. The display information acquisition module acquires information to be shown. The display image generation module generates the display image showing images corresponding to the information acquired by the display information acquisition module in sizes determined by the vision measured by the vision measurement module. The projection process module performs a projection step of projecting the display image generated by the display image generation module as a virtual image at the display position selected by the virtual image position selection module. According to this virtual image display program, it is possible to select a distance at which the virtual image is displayed and enhance the visibility of the display image for the user.

(Variation)

The display image generator 23 may set the color of images corresponding to the respective information included in the display image, based on the hue, brightness, and chroma of the color entered by the user. The virtual image display device 100 displays a color setting screen showing color samples of hue, brightness, and chroma as a virtual image and changes the color of each image shown in the display image based on the color setting information entered by the user.

The color samples show the hue, brightness, and chroma as being continuously graded or graded in steps for selection by the user. Further, the color samples show grades from a particular color (e.g., blue) to a particular color (e.g., red) for selection by the user. The display image generator 23 changes the images corresponding to the respective information by correcting the images with the selected color.

Depending on the color preference, the user may, for example, color the display image in dark blue during daytime and color the display image in dark red at night. The virtual image display device 100 may further enhance the visibility by generating the display image by changing the color of images shown in the display image. Alternatively, the storage 11 may store one or a plurality of types of color setting information of the user so that the user can retrieve and use the color setting information. In this case, each of a plurality of users can store and use the color setting information that affords high visibility of images to the user.

Figure 14:
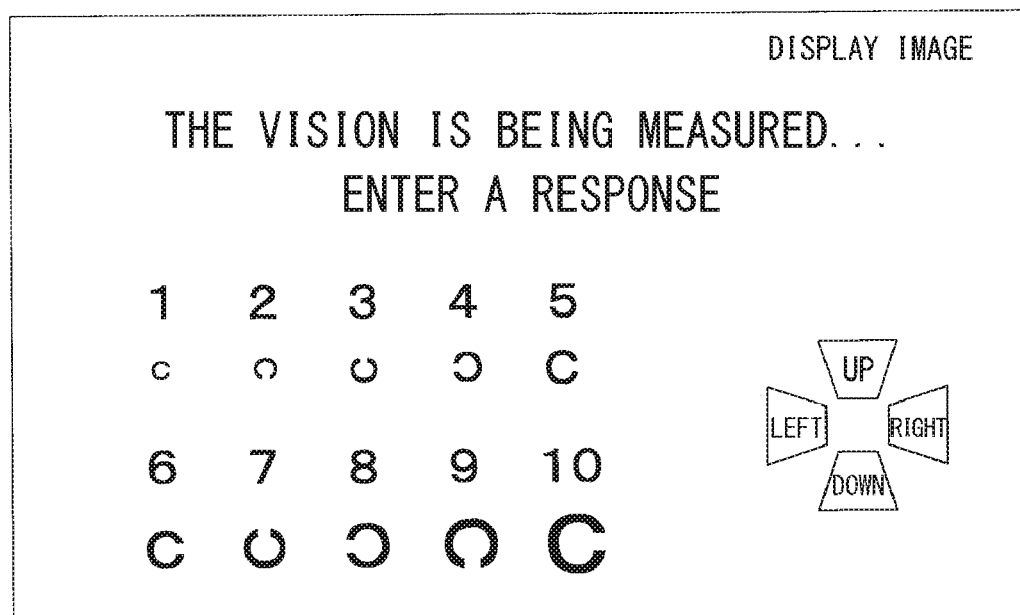
FIG. 14 is a schematic diagram showing an exemplary display image displayed according to the variation when the vision is measured.

The vision measurement image is described in the embodiment as being displayed one by one as a virtual image when the vision of the user is measured. Alternatively, a plurality of vision measurement images may be displayed. FIG. 14 is a schematic diagram showing an exemplary display image displayed according to the variation when the vision is measured. The display image shown in FIG. 14 includes a plurality of Landolt rings as the vision measurement images, a message indicating that the vision is being measured, and a prompt for the user's response.

The user selects one of the plurality of Landolt rings and enters the direction of the slit of by using the input interface 10. As the user successively selects Landolt rings and completes the responses to all images, the vision measurement interface 21 (or the vision measurement interface 121) determines whether the user's response to each vision measurement image is right or wrong and acquires the maximum vision for which a right response is obtained as the user's vision.

Figure 15:
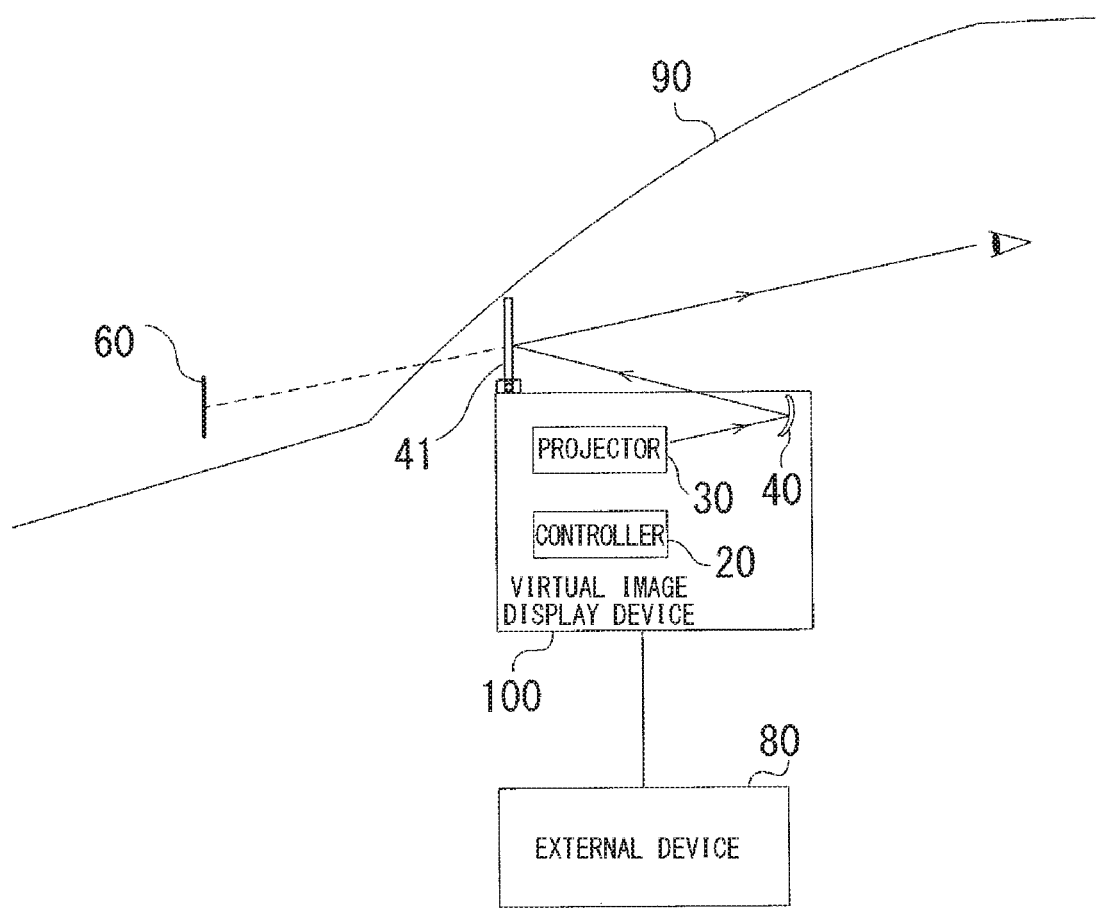
FIG. 15 is a side view schematically showing a configuration of the virtual image display device according to a variation.
Figure 16:
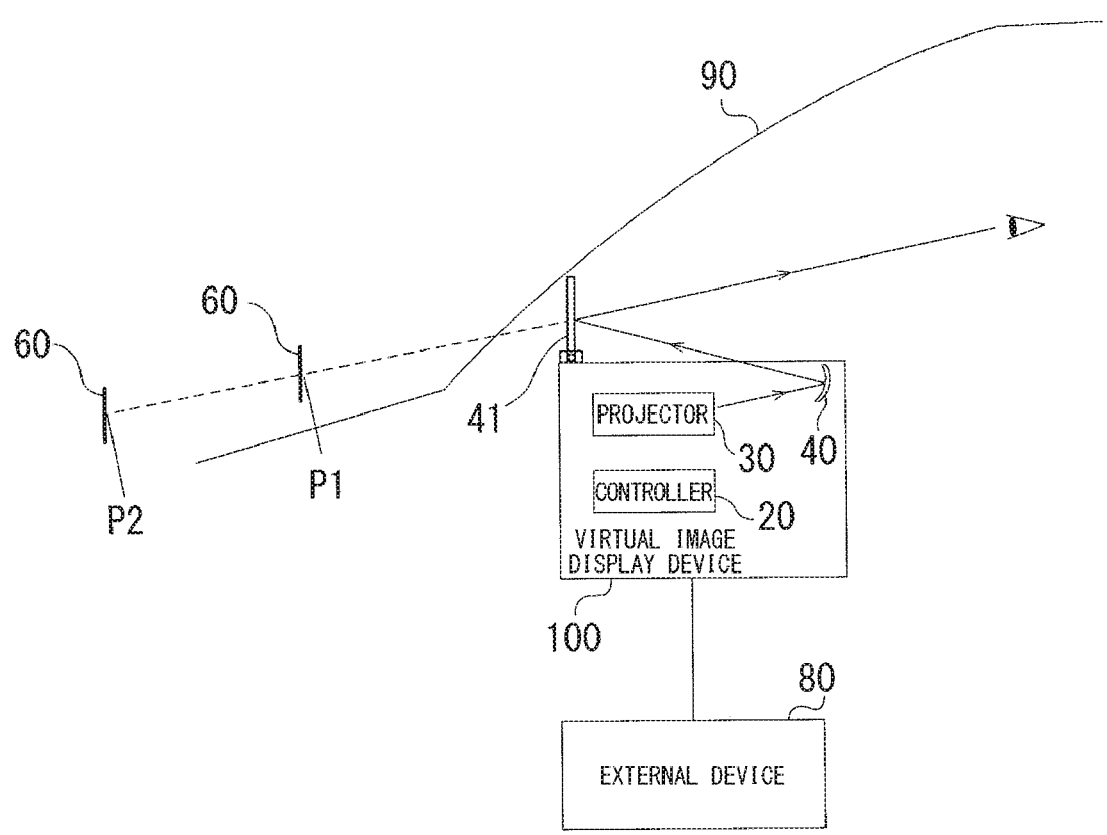
FIG. 16 is a side view schematically showing a configuration of the virtual image display device according to a variation.

In embodiment 1, the virtual image display device 100 projects the display image to the front glass 90. Alternatively, the display image may be projected to a combiner. FIG. 15 is a side view schematically showing a configuration of the virtual image display device 100 according to a variation. In embodiment 2, the virtual image display device 100 projects the display image to the front glass 90. Alternatively, the display image may be projected to a combiner. FIG. 16 is a side view schematically showing a configuration of the virtual image display device 100 according to a variation. For example, the virtual image display device 100 is provided in or on a dashboard below the front glass 90 of a vehicle and displays the virtual image 60 in front of a combiner 41. The virtual image display device 100 is configured such that a projector 30 emits an image display light based on a display image output from a controller 20. The projecting mirror 40 reflects the light and projects the light to the combiner 41.

The combiner 41 is a half mirror and is provided inside the vehicle and behind the front glass 90. The user recognizes an image on which the virtual image 60 is superimposed in a scenery outside the vehicle viewed across the front glass 90. This allows the user to view the virtual image 60 across the front glass 90 and so can access information without substantially moving the line of sight while driving the vehicle.

Described above is an explanation based on an exemplary embodiment. The embodiments are intended to be illustrative only and it will be understood to those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A virtual image display device comprising:
   a virtual image position selector that selects either a first virtual image position or a second virtual image position as a display position of a virtual image,
      the second virtual image position having a different distance in a depth direction from a viewpoint of a user at which the virtual image is displayed from the first virtual image position, and
      the first virtual image position and the second virtual image position are along a common axis from the viewpoint of the user;
   a vision measurement interface that measures a vision of the user based on the user's response to a vision measurement image projected as a virtual image at the display position selected by the virtual image position selector;
   a display information acquirer that acquires information to be shown;
   a display image generator that generates a display image showing an image corresponding to the information acquired by the display information acquirer in a size determined by the vision acquired by the vision measurement interface;
   a projection processor that performs a projection process of projecting the display image generated by the display image generator as the virtual image at the display position selected by the virtual image position selector; and
   when the vision of the user measured at one of the first virtual image position and the second virtual image position is equal to or lower than a predetermined threshold, the virtual image position selector selects another display position, and
   the vision measurement interface measures the vision of the user based on the user's response to the vision measurement image projected as the virtual image at the other display position.

2. The virtual image display device according to claim 1, wherein
   a size of the vision measurement image displayed at the first virtual image position or the second virtual image position differs depending on a distance from a viewpoint position of the user.

3. The virtual image display device according to claim 1, wherein
   a larger a distance from the viewpoint position of the user, a larger a dimension of the vision measurement image.

4. The virtual image display device according to claim 1, wherein
   the display image generator changes a volume of information included in the display image in accordance with the vision measured by the vision measurement interface.

5. The virtual image display device according to claim 1, further comprising:
   a priority level setting interface that sets a priority level of the information acquired by the display information acquirer, wherein
   the display image generator changes a volume of information included in the display image in accordance with the priority level set.

* * * * *